United States Patent
Nyzen

(10) Patent No.: US 10,125,732 B1
(45) Date of Patent: Nov. 13, 2018

(54) HYDROMECHANICAL FUEL SYSTEM WITH DUAL BYPASS

(71) Applicant: EATON CORPORATION, Cleveland, OH (US)

(72) Inventor: Robert J. Nyzen, Hiram, OH (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 80 days.

(21) Appl. No.: 15/049,947

(22) Filed: Feb. 22, 2016

Related U.S. Application Data

(60) Provisional application No. 62/119,499, filed on Feb. 23, 2015.

(51) Int. Cl.
| | |
|---|---|
| *F02C 7/236* | (2006.01) |
| *F02C 9/38* | (2006.01) |
| *F02M 59/16* | (2006.01) |
| *F02M 59/44* | (2006.01) |
| *F02M 59/36* | (2006.01) |
| *F02M 59/12* | (2006.01) |
| *F02M 59/34* | (2006.01) |
| *F02M 37/00* | (2006.01) |
| *F04C 14/26* | (2006.01) |

(52) U.S. Cl.
CPC ........... *F02M 59/447* (2013.01); *F02C 7/236* (2013.01); *F02C 9/38* (2013.01); *F02M 37/0052* (2013.01); *F02M 59/12* (2013.01); *F02M 59/16* (2013.01); *F02M 59/34* (2013.01); *F02M 59/365* (2013.01); *F04C 14/26* (2013.01)

(58) Field of Classification Search
CPC .... F02C 7/236; F02C 9/30; F02C 9/32; F02C 9/38; F02M 37/0029; F02M 37/0052; F02M 59/16; F02M 59/34; F02M 59/365; F04B 49/007; F04C 14/02; F04C 14/26
USPC .......... 417/252, 428; 137/456.13; 60/39.281, 60/734, 736; 123/508, 510, 511
See application file for complete search history.

(56) References Cited

U.S. PATENT DOCUMENTS

| | | | | |
|---|---|---|---|---|
| 4,339,917 A | * | 7/1982 | LaGrone | F02C 7/236 137/565.32 |
| 5,110,269 A | * | 5/1992 | Fallon | F02C 7/236 417/283 |
| 5,495,715 A | * | 3/1996 | Loxley | F02C 7/236 417/202 |
| 6,059,537 A | * | 5/2000 | Cygnor | F04D 13/12 417/203 |
| 6,651,441 B2 | * | 11/2003 | Reuter | F01D 25/20 417/292 |
| 7,845,177 B2 | * | 12/2010 | Parsons | F02C 7/236 60/39.281 |
| 7,983,541 B2 | * | 7/2011 | Clements | F02C 7/224 392/471 |
| 8,408,233 B2 | * | 4/2013 | Reuter | F02C 7/236 137/115.23 |
| 8,523,537 B2 | * | 9/2013 | Garry | F04B 23/06 123/446 |

(Continued)

*Primary Examiner* — Erick Solis
(74) *Attorney, Agent, or Firm* — Fay Sharpe LLP

(57) ABSTRACT

A fuel system is provided that includes a boost stage, a positive displacement pump and a first bypass valve configured to bypass fuel to one of the boost stage and the positive displacement pump. A second bypass valve is configured to bypass fuel to the other of boost stage and the positive displacement pump.

16 Claims, 3 Drawing Sheets

(56) References Cited

U.S. PATENT DOCUMENTS

| | | | | |
|---|---|---|---|---|
| 8,616,858 B2* | 12/2013 | Rosner | ............ | F15B 11/17 |
| | | | | 137/115.03 |
| 8,991,148 B2* | 3/2015 | Dore | ............ | F01D 21/02 |
| | | | | 60/39.091 |
| 9,494,080 B2* | 11/2016 | Neate | ............ | F04C 11/005 |
| 2003/0046937 A1* | 3/2003 | Mahoney | ............ | F02C 9/263 |
| | | | | 60/773 |
| 2009/0159054 A1* | 6/2009 | Suzuki | ............ | F02M 59/16 |
| | | | | 123/506 |
| 2010/0037867 A1* | 2/2010 | Kleckler | ............ | F02C 7/236 |
| | | | | 123/510 |
| 2014/0205472 A1* | 7/2014 | Hutto, Jr. | ............ | F04B 25/00 |
| | | | | 417/244 |

* cited by examiner

HYDROMECHANICAL FUEL SYSTEM WITH DUAL BYPASS

This application claims the priority benefit of U.S. provisional application Ser. No. 62/119,499, filed Feb. 23, 2015, the disclosure of which is hereby incorporated herein in its entirety.

BACKGROUND

This disclosure relates to a fuel system, and particularly to a system that includes hydromechanical control of the fuel system associated with a positive displacement pump that delivers desired fuel flow from an upstream supply to a downstream engine.

Traditional fuel systems use a metering valve and bypass valve in conjunction with a positive displacement pump to control flow to an engine. This configuration requires a minimum pressure rise across the positive displacement pump to provide control for the bypass valve. If the bypassed fuel was returned to a centrifugal stage further upstream, the minimum pressure rise can be satisfied but there is an increase in the required pump input power.

SUMMARY

A hydromechanical fuel control system delivers fuel flow from a positive displacement pump to a downstream engine and includes a dual bypass.

The fuel system includes a boost stage that delivers flow to the positive displacement pump. A first bypass valve is configured to bypass fuel to one of the boost stage and the positive displacement pump. A second bypass valve is configured to bypass fuel to the other of the boost stage and the positive displacement pump.

In one embodiment, the first bypass valve is configured to bypass fuel to the boost stage.

The system includes a metering valve downstream of the positive displacement pump.

The system further includes a differential pressure regulator wherein the first bypass valve is controlled by the differential pressure regulator.

The differential pressure regulator senses metering valve upstream and downstream pressures.

In a second embodiment, the first bypass valve is configured to bypass fuel to the positive displacement pump.

In one embodiment, the boost stage is a centrifugal pump boost stage that includes at least a first centrifugal pump having an outlet that communicates with an inlet of a second centrifugal pump.

One of the first and second bypass valves bypasses fuel to the inlet of the second centrifugal pump.

In the one embodiment, the first bypass valve bypasses fuel to the inlet of the second centrifugal pump and is controlled by a signal received from a pressure regulator that monitors pressure upstream and downstream of the metering valve, and more specifically directs flow from downstream of the positive displacement pump and upstream of the metering valve to the inlet of the second centrifugal pump in response to the sensed differential pressure across the metering valve.

In the one embodiment, the second bypass valve directs flow from downstream of the metering valve to the positive displacement pump.

In the second embodiment, the first bypass valve bypasses fuel to the inlet of the positive displacement pump in response to sensed differential pressure across the metering valve, and the second bypass valve bypasses fuel to the boost stage.

In one version of the second embodiment, the first bypass valve directs flow to an inlet of the second centrifugal pump of the centrifugal pump boost stage.

In a third embodiment, the differential pressure regulator is omitted from the system.

Some of the advantages of the system are associated with control of the speed and accuracy of the response, and also power savings.

Still other benefits and advantages of the system will become apparent to those skilled in the art upon reading and understanding the following detailed description.

DETAILED DESCRIPTION

In a typical fuel system where the bypass flow is returned to the inlet of the positive displacement pump, there must be a minimum pressure rise to maintain controllability of the metering and bypass valves. In the event that the pressure rise across the positive displacement pump is not adequate to maintain controllability, the bypass flow may be returned further upstream to a centrifugal element. This requires additional input power to pressurize the bypass flow. It has been determined that by using two bypass valves the input power increase can be minimized and the system optimized.

Figure 1:
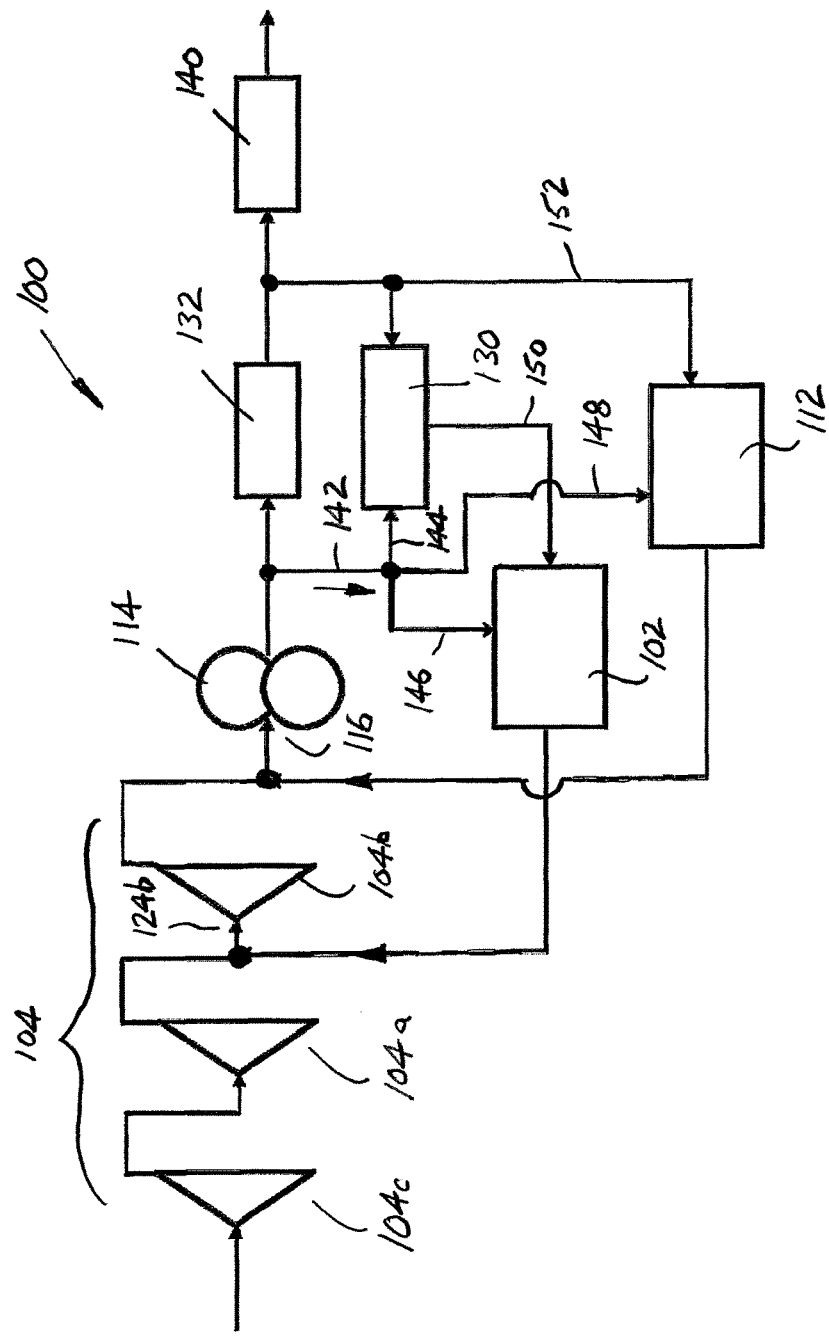
FIG. 1 is a schematic illustration of an embodiment of the invention.

Referring to FIG. 1, a hydromechanical fuel system 100 with a dual bypass configuration is shown according to an embodiment of the invention. In the illustrated embodiment, a first bypass valve 102 controls bypassing of fuel upstream of a boost stage 104, such as a multi-stage centrifugal stage, which in the schematic shown in FIG. 1 is one of the multi-stage centrifugal elements. More specifically, the multi-stage centrifugal boost stage 104 includes at least a first centrifugal pump and a second centrifugal pump, and is shown here as including a first centrifugal pump 104a, and a second centrifugal pump 104b. The third centrifugal pump 104c is shown as being upstream of the first and second centrifugal pumps 104a, 104b, and is merely representative that more than two pumps could be used in the multistage boost stage of the system 100 (i.e., "a", "b", and "c" do not reflect the particular order or location of the multistage pumps that are disposed in series). One skilled in the art will also recognize that the fuel from the first bypass valve 102 could be bypassed or recirculated to the inlet of any one of the centrifugal pumps 104a-104c.

In this embodiment, the minimum pressure rise can be maintained for controllability, but there is excessive input power required to pressurize this flow by the centrifugal element 104. In the system 100 shown in FIG. 1, there is a second bypass valve 112 in addition to the first bypass valve 102. The second bypass valve 112 returns bypass flow to a positive displacement pump 114, and particularly inlet 116 of the positive displacement pump (high pressure stage), while the first bypass valve 102 returns flow to a centrifugal stage inlet (shown here as inlet 124b of the second centrifugal pump 104b). The first bypass valve 102, which returns flow to the centrifugal stage inlet 124b, is controlled by a differential pressure regulator 130 (ΔP Reg) that senses upstream and downstream pressures of a metering valve 132 (M/V). This combination of a bypass valve 102 and differential pressure regulator 130 work as an integrator to maintain the metering valve 132 differential pressure. The second bypass valve 112 that returns flow to the positive displacement pump inlet 116 senses the upstream and downstream metering valve 132 pressures and acts as a proportional gain in the system 100. By setting the spring and window geometry (not shown, but conventional, well-known structures in the art) of the second bypass valve 112, the flow split between the two bypass valves 102, 112 can be set for steady state operation. This allows the metering and bypass system 100 to operate at a higher differential pressure while minimizing the input power by bypassing a portion of the flow to the positive displacement pump inlet 116 where the positive displacement pump 114 can be operated to a lower minimum pressure rise.

Referring still to FIG. 1, in operation, having the integrator (i.e., combination of the first bypass valve 102 and differential pressure regulator 130) bypass to the centrifugal stage inlet 124b provides accuracy across the entire operating range. The use of a proportional element in the system 100 (i.e. second bypass valve 112) enables improved system response to a metering valve 132 differential pressure error and typically allows for removal of a portion of the damping applied to the integrator element 102, 130. However, in the event that the differential pressure across the positive displacement pump 114 is low, the metering and bypass system 100 is reliant on the damping of the integrator element 102, 130. This combination of damping between the two bypass valves 102, 112 is critical to stability over the entire operating range. Additionally, when the high pressure stage 114 differential pressure drops, the proportional bypass 112 will have less flow and therefore more bypass flow will return to the centrifugal stage 104 and there will be less power savings.

Thus, the positive displacement pump 114 pressurizes flow from an upstream supply and directs the pressurized flow toward the metering valve 132 and the pressurizing valve 140 (which sets the floor pressurizing level of the system 100). A combination flow path and sense line 142 branches off from upstream of the metering valve 142 and provides a first pressure signal in line 144 to the pressure regulator 130, directs fuel to flow path 146 for the first bypass valve 102, and also directs fuel to the second bypass valve 112 via a combined flow path/sense line 148. In addition, sense line 150 communicates between the pressure regulator 130 and the first bypass valve 102 such that the amount of flow from the flow path/sense line 146 through the first bypass valve is in response to the signals in lines 146, 150. Similarly, the amount of flow from the combined flow path/sense line 148 through the second bypass valve 112 is in response to the signals in line 148 and sense line 152. One skilled in the art will also appreciate that the fluid paths need not be specifically configured as illustrated, for example, the combined flow path/sense line 146 could be modified so that the sense line could be a dedicated line taken from another location upstream of the metering valve 132. However, the relationship and functionality of the bypass valves 102, 112, boost stage 104, positive displacement pump 114, pressure regulator 130, and the metering valve 132 does provide for an optimized, responsive system 100 that minimize the increase in input power required.

Figure 2:
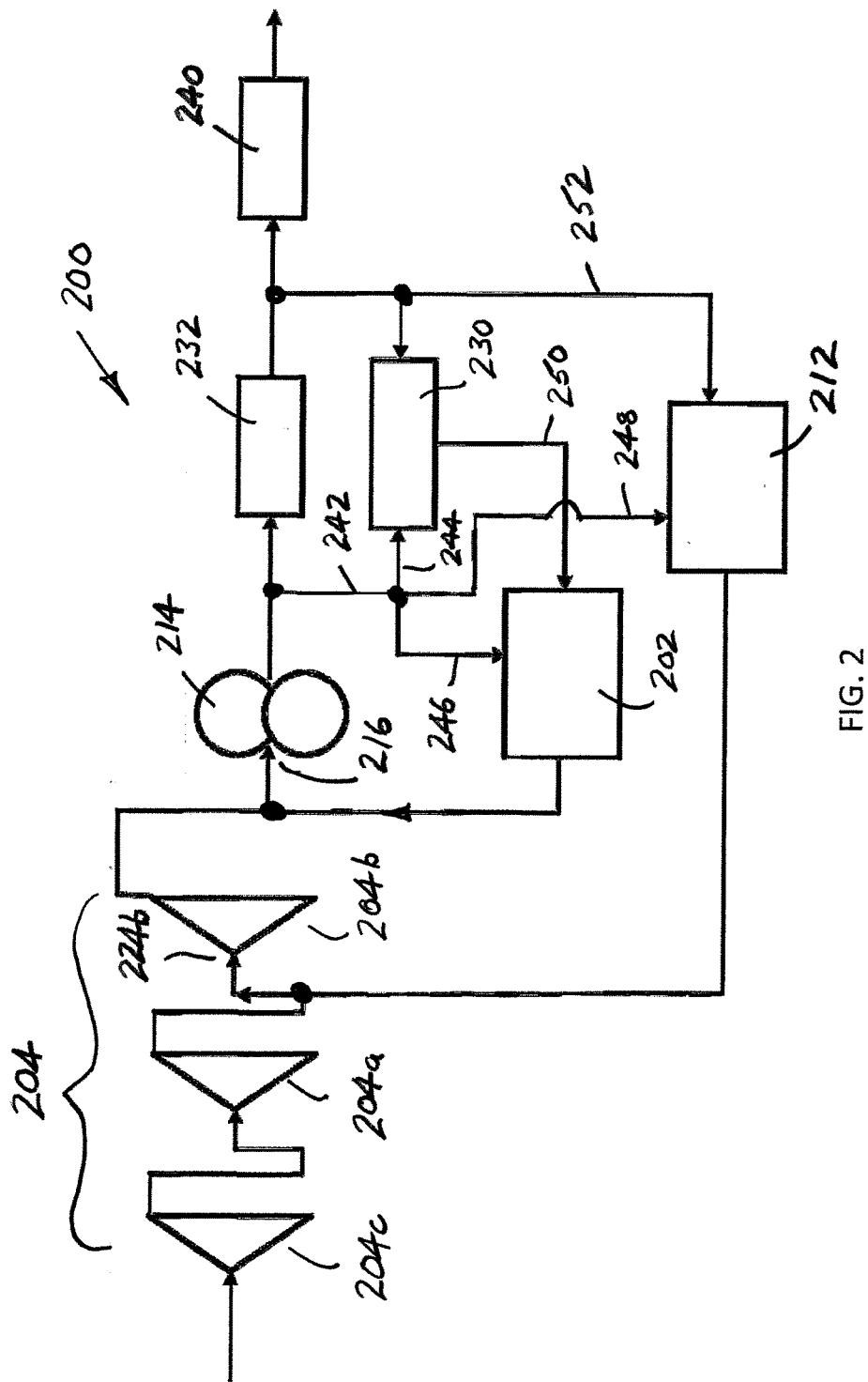
FIG. 2 is a schematic illustration of another embodiment of the invention.

Referring to FIG. 2, another embodiment is shown. For purposes of consistency and brevity, like components will be referred to by reference numerals in the "200" series (e.g., in FIG. 1, the system was referred to by reference numeral 100, and in FIG. 2 the system is referred to by reference numeral 200). The system 200 of FIG. 2 is substantially similar to the system 100 shown in FIG. 1 except that the first and second bypass valves 202, 212 are configured to bypass fuel to the positive displacement pump 214 and boost stage 204, respectively. Having the integrator (202/230) bypass to the high pressure stage inlet 216 provides a more responsive system, but when the high pressure stage 214 differential pressure is low then the integrator becomes less effective and there will be additional difficulty in maintaining metering valve 232 differential pressure within allowable limits. This may or may not be acceptable for metered flow accuracy depending on system 200 requirements. When the high pressure stage 214 differential pressure drops the proportional bypass 230 will have less flow and therefore more bypass flow will return to the high pressure stage inlet 216 and there will be more power savings.

Figure 3:
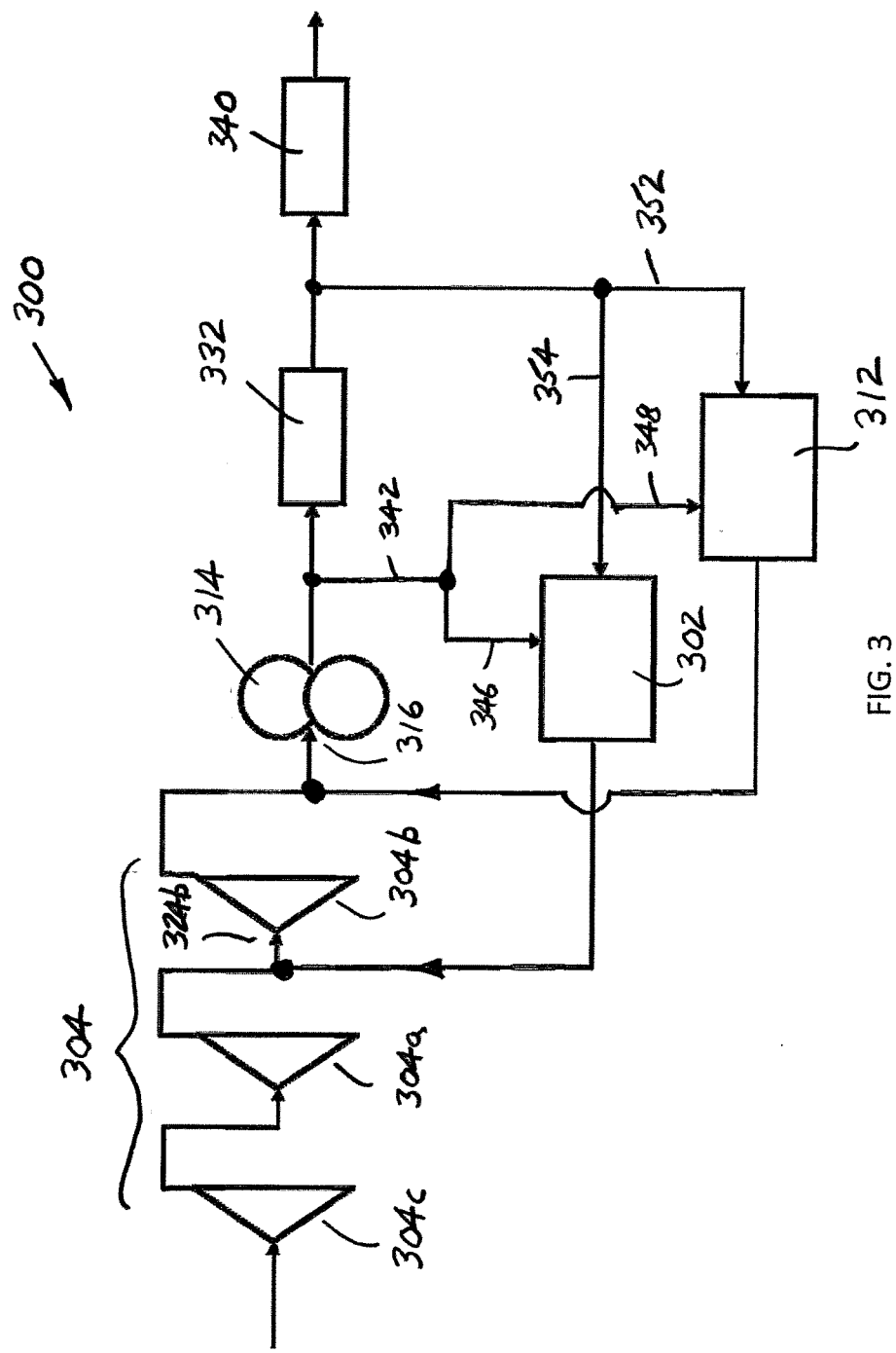
FIG. 3 is a schematic illustration of another embodiment of the invention.

Referring to FIG. 3, another embodiment is shown. Again, for purposes of consistency and brevity, like components will be referred to by reference numerals in the "300" series (e.g., in FIG. 2, the system was referred to by reference numeral 200, and in FIG. 3 the system is referred to by reference numeral 300). The system 300 of FIG. 3 is substantially similar to the systems shown in FIGS. 1 and 2 without the differential pressure regulator 130, 230 that was used in those respective systems 100, 200. Having two proportional bypass valves 302, 312 provides for a relatively fast and stable system 300, but the metering valve 332 differential pressure will drop based on the bypass valve design. The result is a sacrifice in accuracy, but an improvement in stability and responsiveness to a metered flow disturbance. In this configuration, it is easier to set and maintain the bypass flow ratio between the two valves 302, 312 across the operating range. It will also be appreciated that the removal of the pressure regulator from the system 300 requires the responsiveness of the first proportional bypass valve 302 to rely on sense line 346 and sense line 354 that communicates with sense line 352 (that proceeds from downstream of the metering valve 332).

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

What is claimed is:

1. An engine fuel supply system, comprising:
  a boost stage;
  a positive displacement pump;
  a metering valve downstream of the positive displacement pump that receives flow therefrom;
  a first bypass valve configured to bypass fuel received from the positive displacement pump to one of the boost stage and the positive displacement pump, the first bypass valve operatively associated with the metering valve such that operation of the first bypass valve is responsive to upstream and downstream pressures across the metering valve;
  a second bypass valve configured to bypass fuel received from the positive displacement pump to the other of the boost stage and the positive displacement pump, the second bypass valve operatively associated with the metering valve such that operation of the second bypass valve is responsive to upstream and downstream pressures across the metering valve;

a differential pressure regulator and wherein at least the first bypass valve is controlled by the differential pressure regulator; and wherein the first bypass valve and the second bypass valve operate independently of one another.

2. The engine fuel supply system of claim 1 wherein the first bypass valve is configured to bypass fuel to the boost stage.

3. The engine fuel supply system of claim 1 further including a metering valve and wherein the differential pressure regulator senses metering valve upstream and downstream pressures.

4. The engine fuel supply system of claim 1 wherein the first bypass valve is configured to bypass fuel to the positive displacement pump.

5. An engine fuel supply system comprising:
a centrifugal pump boost stage;
a positive displacement pump that receives flow from the boost stage;
a metering valve downstream of the positive displacement pump that receives flow therefrom;
a first bypass valve downstream of the positive displacement pump configured to bypass fuel received therefrom to one of the boost stage and the positive displacement pump in response to sensed differential pressure across the metering valve;
a second bypass valve downstream of the positive displacement pump configured to bypass fuel received therefrom to the other of the boost stage and the positive displacement pump, the second bypass valve operatively associated with the metering valve such that operation of the second bypass valve is responsive to upstream and downstream pressures across the metering valve, wherein the second bypass valve receives flow from the positive displacement pump without passing through the first bypass valve; and
a differential pressure regulator that senses the upstream and downstream pressures of the metering valve, and wherein the first bypass valve is controlled by the differential pressure regulator.

6. The engine fuel supply system of claim 5 wherein the centrifugal pump boost stage includes at least a first centrifugal pump having an outlet that communicates with an inlet of a second centrifugal pump.

7. The engine fuel supply system of claim 6 wherein one of the first and second bypass valves bypasses fuel to the inlet of the second centrifugal pump.

8. The engine fuel supply system of claim 7 wherein the first bypass valve bypasses fuel to the inlet of the second centrifugal pump.

9. The engine fuel supply system of claim 8 wherein the first bypass valve directs flow from downstream of the positive displacement pump and upstream of the metering valve to an inlet of the second centrifugal pump in response to sensed differential pressure across the metering valve.

10. The engine fuel supply system of claim 9 wherein the second bypass valve directs flow from downstream of the metering valve to the positive displacement pump.

11. The engine fuel supply system of claim 6 wherein the second bypass valve directs flow from downstream of the metering valve to the positive displacement pump.

12. The engine fuel supply system of claim 6 wherein the second bypass valve bypasses fuel to the inlet of the positive displacement pump.

13. The engine fuel supply system of claim 5 wherein the first bypass valve bypasses fuel to the inlet of the positive displacement pump, and the second bypass valve bypasses fuel to the boost stage.

14. The engine fuel supply system of claim 13 wherein the centrifugal pump boost stage includes at least a first centrifugal pump having an outlet that communicates with an inlet of a second centrifugal pump.

15. The engine fuel supply system of claim 14 wherein the second bypass valve bypasses fuel to the inlet of the second centrifugal pump.

16. The engine fuel supply system of claim 5 wherein the first bypass valve communicates to an inlet of the centrifugal pump boost stage.

\* \* \* \* \*